UNITED STATES PATENT OFFICE.

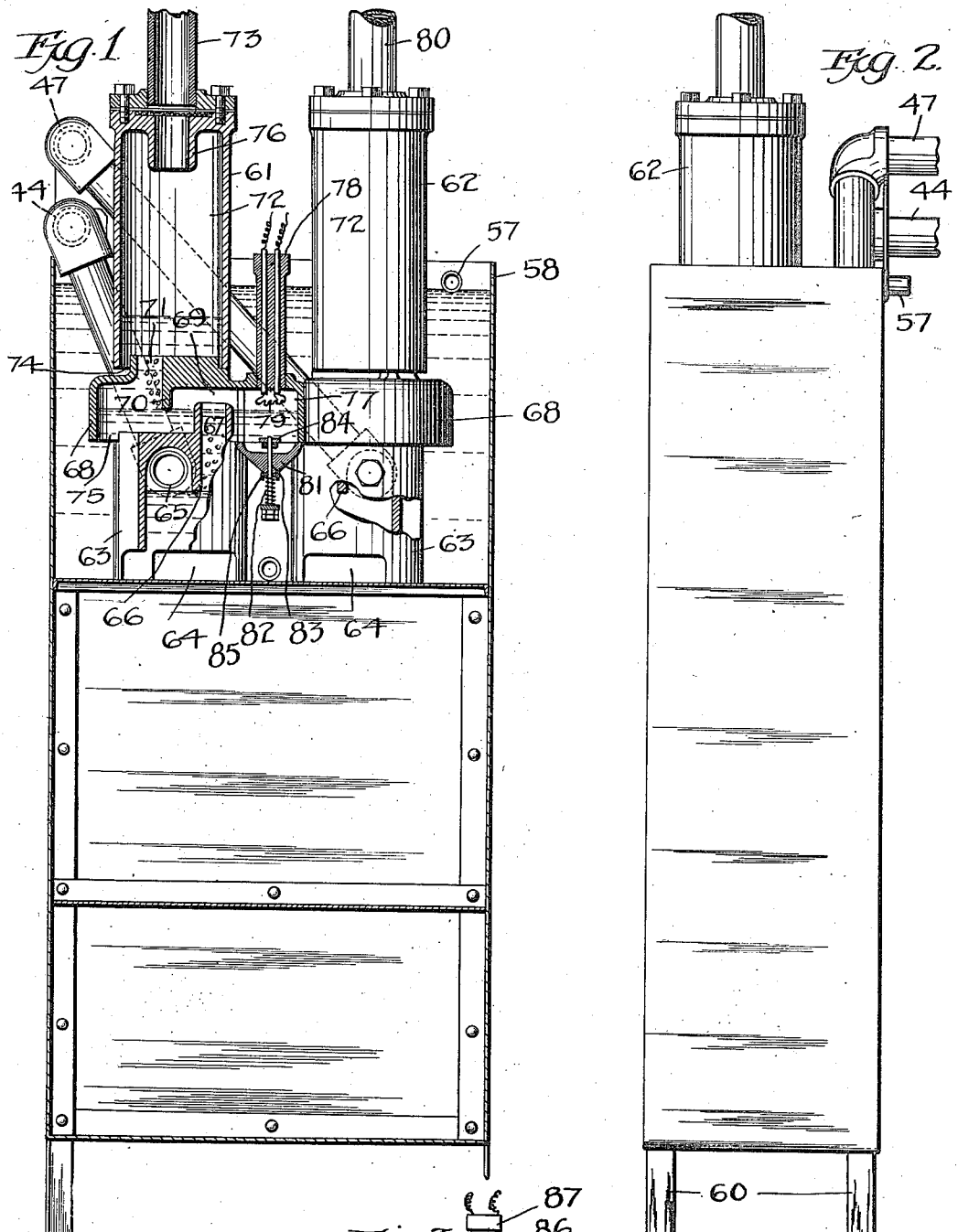

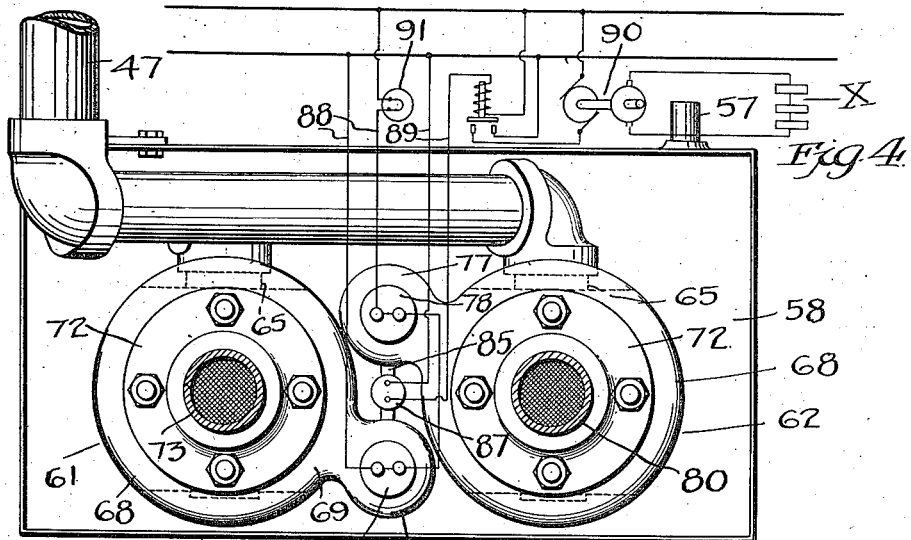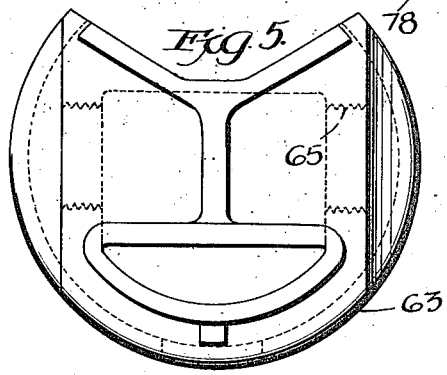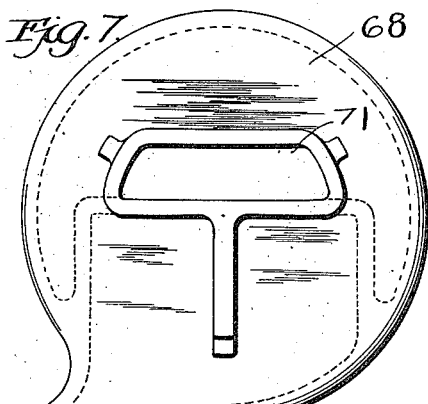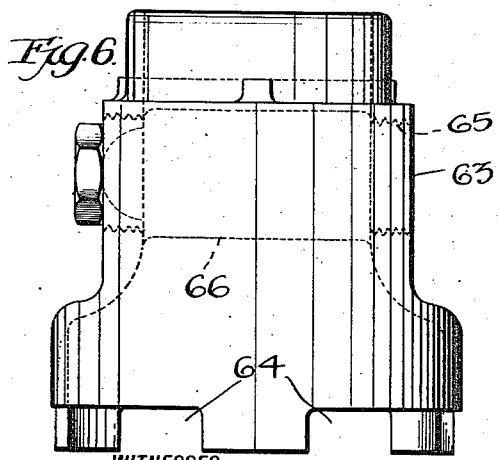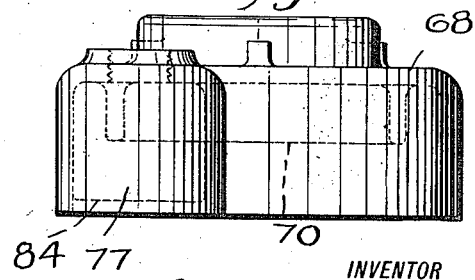

GEORGE HALTER, OF NEW YORK, N. Y., ASSIGNOR TO DAVIS-BOURNONVILLE COMPANY, OF NEW YORK, N. Y., A CORPORATION OF NEW YORK.

PRESSURE-REGULATOR.

1,172,886.  Specification of Letters Patent.  Patented Feb. 22, 1916.

Application filed October 20, 1914. Serial No. 867,592.

*To all whom it may concern:*

Be it known that I, GEORGE HALTER, a citizen of the French Republic, and a resident of the borough of Manhattan, in the city, county, and State of New York, have invented certain new and useful Improvements in Pressure-Regulators, of which the following is a specification.

This invention is a pressure regulator, designed more especially for maintaining a fixed relation or balance of pressure between the gas chambers of electrolytic apparatus for the production of oxygen and hydrogen; and the object is to provide a simple, effective and reliable device for performing the function indicated.

Further objects are to incorporate in the pressure regulator provisions for relieving excessive back-pressure in the delivery systems, and to provide submerged explosion chambers, through which the two gases must pass and where they are exposed to igniters, which produce localized explosions in the event of impure gases passing over from the generating apparatus. Such explosion serves as a signal and may also be utilized to perform certain automatic functions, such as shutting down the plant.

In the accompanying drawings: Figure 1 is a side sectional elevation of the pressure regulator unit; Fig. 2 is a front elevation of the same; Fig. 3 is a detail fragmentary side elevation illustrating a mode of utilizing the force of explosions in the explosion chambers; Fig. 4 is a plan view of the pressure regulator illustrating also diagrammatically the control by the impure-gas-detector of the motor generator set supplying current to the cells; Fig. 5 is a plan view of the bottom section of one of the inclosures in the pressure regulator tank; Fig. 6 is an elevation thereof; Fig. 7 is a plan view of the mid-section of said inclosure; and Fig. 8 is an elevation of said mid-section.

The numerals 44 and 47 designate offtake pipes leading from the gas spaces of the electrolyte cells, wherein water is decomposed into its constituent gases, oxygen and hydrogen. These pipes extend downward from a suitable elevation, to the lower part of a tank 58, which may be supported on a stand 60, and enter the sides of separate inclosures 61 and 62 within the tank. The tank constitutes a means for holding a body of water, or its equivalent communicating bodies of water, open to the pressure of the atmosphere, and the inclosures, the interiors of which are in free communication with the general interior of the tank below the water level, serve to collect and separate the gases which bubble up through the water. The height at which the gases are permitted to pass upward is the same in both inclosures, and, the water level being the same for both, it follows that the pressures in the two conduits 44 and 47 necessary to overcome the hydrostatic resistance must be equal, and with conduits of ample cross-section the same pressures obtain in the generating apparatus. The amount of the pressure is dependent upon the level of the water in the tank, and this is conveniently established by means of an overflow 57, which permits filling of the tank 58 up to a predetermined level but not beyond.

The inclosures 61 and 62 are preferably duplicates and are constructed in a simple and inexpensive manner of superposed hollow castings, which may simply rest one upon the other or be bolted if preferred. The lowest section 63 of each rests on the bottom of the tank 58 and is provided with openings 64 for the admission of water and with an inlet 65, to which the pipe 44 or 47, as the case may be, is connected. The said inlet opens into a recess in the top of the section behind a depending baffle wall 66, the lower edge of which determines the depth of the column of water to be displaced, and is located at the same height in both inclosures. From the bottom section the gases pass upward through a passage 67 into the interior of the mid-section 68. An important part of the mid-section is an explosion chamber 69, into which the passage 67 projects. This chamber is formed by walls arranged in such manner that the gas entering the same is pocketed and collects until it lowers the water in the chamber sufficiently to permit it to escape beneath a depending baffle wall 70. The gas then rises through a passage 71 in the mid-section into the top section 72, which constitutes a collecting chamber connected at its upper end with the delivery pipe 73. The formation of the adjoining portions of the superposed sections is such that openings 74 are afforded between the mid and top sections, placing the interior of the section 72 in communication with the liquid in the tank, these openings constituting safety vents permitting any accumulated pressure in the delivery system to blow out through the water in the tank of the pressure regulator rather than to force its way back into the cells. In like manner, openings 75 are left between the mid and bottom sections, serving as additional vents and also to guard against any upward rush of gas driving the water out of the upper portion of the inclosure. The outlet in the top of the collecting section 72 is surrounded by a depending flange or nozzle 76, which is provided for the purpose of causing any condensed moisture or caustic, which might otherwise be carried into the delivery pipe, to drop back into the liquid in the tank. It will be observed that the gas outlets from the inclosures are of large area so that the gases pass freely to the piping system, and consequently the only back pressure on the gases flowing from the cells of the electrolyzer is the hydrostatic head, which is the same upon both the gases.

The explosion chamber 69 of each inclosure is formed with a lateral extension 77, and as shown in Fig. 4 these extensions are preferably arranged between the two inclosures. Into the top of each of these extensions there is tapped a plug 78, carrying a platinum wire 79 exposed to the gas in the explosion chamber. This wire is of suitable cross-sectional area to be rendered incandescent by the passage of electric current of appropriate strength, and thus constitutes a continuous impure-gas-detector, which has no effect as long as the gas is pure but will produce an explosion in event of even a small proportion of the other gas being admixed therewith. The explosion thus produced being water-sealed both from the oxygen and hydrogen delivery pipes 80 and 73 and from the offtake pipes 44 and 47, cannot be propagated in either direction. The occurrence of the explosion may be relied upon as an indicator, but preferably means are provided for utilizing its force to effect an automatic function, such as the shutting down of the motor generator set supplying current to the cells. This is illustrated partly by diagram. A movable part or piston 81 is disposed at the bottom of each of the explosion chamber extensions 77, where it is normally held in place by a spring 82 encircling a rod 83 which passes loosely through the piston and is secured at its upper end to a stationary part 84. Upon the occurrence of an explosion, the piston is forced downward against the action of its spring, and in so doing carries downward a bar 85, the end portions of which underlie the pistons of both chambers. The arrangement is such that when one of the pistons is forced downward, this bar fulcrums on the rod 82 of the other piston, while if both of the pistons descend it is carried down bodily. To its center is secured a flexible connection 86, which extends to a pull switch 87 of ordinary construction. The electrical connections are shown diagrammatically in Fig. 4, where 88 represents the circuit for supplying current to the igniter wires 79, and 89 a circuit controlled by the switch 87 and in turn controlling the starting device of the motor generator set 90, which supplies current to the cells represented diagrammatically at X. A lamp 91 in the igniter circuit 88 is provided for the purpose of indicating whether the igniters are in operative condition. From the foregoing it will be understood that an explosion, due to impure gas entering one or other of the explosion chambers, interrupts the control circuit 89 and thereby stops the motor generator, shutting down the entire plant.

What I claim as new is:

1. In a device of the character described, the combination of means for holding a body of liquid open to atmospheric pressure, separate gas inlets permitting the gases to escape upward into the body of water at equal distances below the surface, separate devices for collecting the gases rising through the water, and outlets of large area permitting free escape of the gases from said collecting devices.

2. In a device of the character described, the combination of a tank adapted to hold a body of liquid open to atmospheric pressure and provided with means for determining a certain level therein, separate gas inlets permitting the gases to escape upward into the body of water at equal distances below the surface, separate devices for collecting the gases rising through the water, and outlets of large area permitting free escape of the gases from said collecting devices.

3. A device of the character described comprising a liquid holder open to atmospheric pressure and having separate gas inlets below the liquid level, and inclosures in said liquid holder open to the liquid and constructed separately to confine the rising gases and having delivery pipes leading from their upper portions, said inclosures having safety vents opening into the liquid in the liquid holder above said inlets.

4. A device of the character described, comprising a liquid holder open to atmospheric pressure and having separate gas inlets below the liquid level, inclosures in said holder arranged to confine the gases rising through the liquid and affording outlets therefor and having their interiors in open communication with the liquid in the holder, one of each of said inclosures having a chamber formed to pocket a body of the gas below the liquid level, and an igniter in said chamber.

5. In a device of the character described, the combination of a liquid holder open to atmospheric pressure, a gas inlet below the liquid level, an inclosure in said liquid holder open to the liquid and arranged to collect the rising gas, a gas outlet from the upper part of said inclosure, and a safety vent from the inclosure opening into the liquid in the liquid holder above the gas inlet.

6. An impure gas detector for electrolyzers, comprising a liquid holder having an inlet for the gas below the level of the liquid, means for pocketing a body of the rising gas below the liquid level in the holder, and an igniter in the pocket of gas thus formed.

7. In a device of the character described, the combination of a liquid holder open to atmospheric pressure, a gas conduit delivering therein below the liquid level, an inclosure in said holder arranged to confine the gas rising through the liquid and affording an outlet therefor and having its interior in open communication with the liquid in the holder, said inclosure being formed of superimposed sections comprising a bottom section into which the conduit opens, a midsection arranged to receive the gases rising from the bottom section and forming an explosion chamber in which a body of the gas is trapped, and a top section forming a collecting and outlet chamber, and an igniter in the explosion chamber.

8. In a device of the character described, the combination of a liquid holder open to atmospheric pressure, a gas conduit delivering therein below the liquid level, an inclosure in said holder arranged to confine the gas rising through the liquid and affording an outlet therefor and having its interior in open communication with the liquid in the holder, said inclosure being formed of superimposed castings, comprising a lower section into which the conduit opens, and a section above the same forming an explosion chamber in which a body of the gas is trapped, and an igniter in said chamber.

9. In a device of the character described, the combination of a liquid holder open to atmospheric pressure, a gas conduit delivering therein below the liquid level, an inclosure in said holder arranged to confine the gas rising through the liquid and affording an outlet therefor and having its interior in open communication with the liquid in the holder, said inclosure being formed of superimposed castings, comprising a lower section into which the conduit opens, and a section above the same forming an explosion chamber in which a body of the gas is trapped, and an igniter in said chamber, the adjoining portions of the sections being constructed so as to afford communication between the interior and the exterior thereof.

In testimony whereof I have signed my name in the presence of two subscribing witnesses.

GEORGE HALTER.

Witnesses:
J. F. BRANDENBURG,
E. GREENBERGER.